(12) United States Patent
Hooper, III

(10) Patent No.: US 6,947,393 B2
(45) Date of Patent: Sep. 20, 2005

(54) SEGMENTED FIBER CHANNEL ARBITRATED LOOP AND INTRA-LOOP ROUTING SYSTEM

(75) Inventor: William Gordon Hooper, III, Orangevale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 812 days.

(21) Appl. No.: 09/823,382

(22) Filed: Mar. 30, 2001

(65) Prior Publication Data

US 2002/0141333 A1 Oct. 3, 2002

(51) Int. Cl.[7] .............................................. H04L 12/28
(52) U.S. Cl. ........................ 370/258; 370/392; 370/406
(58) Field of Search ................................ 370/252, 258, 370/352, 389, 392, 400, 404, 405, 406, 424, 428, 255, 257, 401, 403

(56) References Cited

U.S. PATENT DOCUMENTS

| | | | | |
|---|---|---|---|---|
| 6,000,020 A | * | 12/1999 | Chin et al. ................... | 370/401 |
| 6,243,386 B1 | * | 6/2001 | Chan et al. ................... | 370/403 |
| 6,374,316 B1 | * | 4/2002 | James et al. ................. | 370/258 |
| 6,470,007 B1 | * | 10/2002 | Berman ....................... | 370/351 |
| 6,510,141 B1 | * | 1/2003 | Ramfelt et al. ............. | 370/254 |
| 2003/0198251 A1 | * | 10/2003 | Black et al. ................. | 370/462 |
| 2004/0024930 A1 | * | 2/2004 | Nakayama et al. ............ | 710/5 |

* cited by examiner

*Primary Examiner*—Chi Pham
*Assistant Examiner*—Anh-Vu H Ly

(57) ABSTRACT

A system for selectively routing data within a fiber channel arbitrated loop, including an intra-loop router configured to be coupled between a first segment and a second segment of the fiber channel arbitrated loop. The intra-loop router includes a router controller configured to be coupled with the first and second segments, and a processing system coupled with the router controller. The processing system is configured to receive fiber channel frames and cause those frames to be re-transmitted onto a selected one of the first and second segments of the fiber channel arbitrated loop.

10 Claims, 4 Drawing Sheets

| DEVICE | FRONT | BACK |
|---|---|---|
| 1 | 04 | 04 |
| 2 | 08 | 08 |
| 3 | 0F | 0F |
| 4 | 17 | 17 |
| 5 | 1D | 1E |
| 6 | 23 | 23 |
| 7 | 2B | 2A |

90, 94, 92

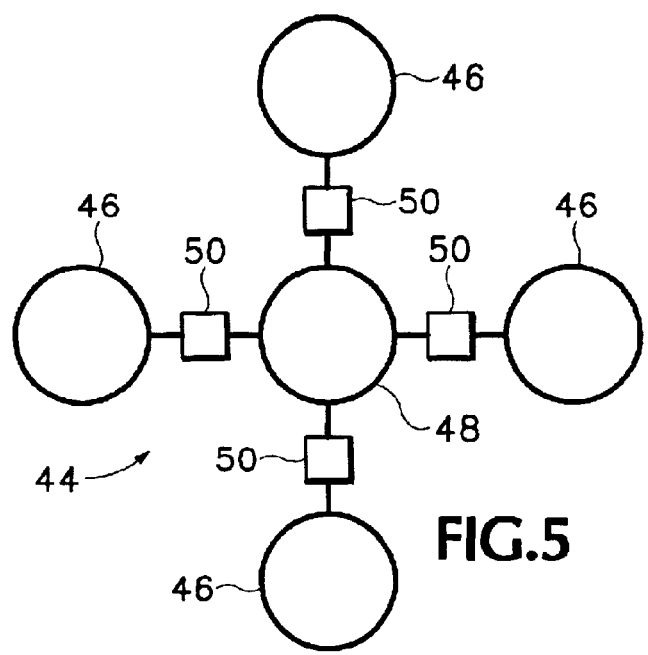
FIG.5
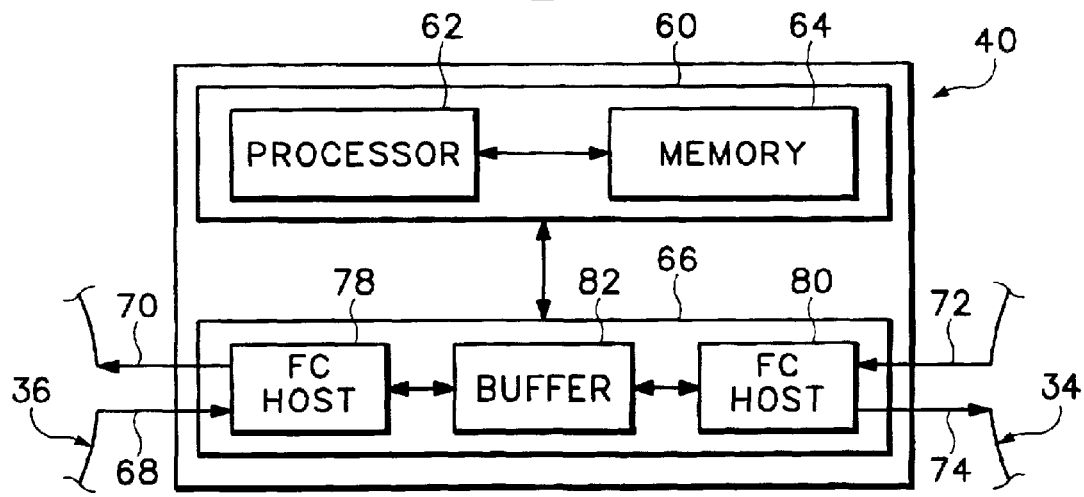
FIG.6
| DEVICE | FRONT | BACK |
|--------|-------|------|
| 1 | 04 | 04 |
| 2 | 08 | 08 |
| 3 | 0F | 0F |
| 4 | 17 | 17 |
| 5 | 1D | 1E |
| 6 | 23 | 23 |
| 7 | 2B | 2A |
FIG.7

SEGMENTED FIBER CHANNEL ARBITRATED LOOP AND INTRA-LOOP ROUTING SYSTEM

TECHNICAL FIELD

The present invention relates to systems and methods for selectively routing data within a fibre channel arbitrated loop.

BACKGROUND OF THE INVENTION

CPU processing power has continued to double on the average of every two years over the past twenty years. However, the performance of mass storage devices and computer bus interconnections between mass storage devices and CPUs has not increased at the same rate. As a result, performance in modem computer systems may be limited by the speed at which data can be accessed and transported between memory and peripheral devices, such as hard disk drives. In addition, computer systems may be limited by the amount of data that they can efficiently access.

The small computer system interface ("SCSI") bus is the most widespread and popular computer bus for interconnecting mass storage devices, such as hard disks and CD-ROM drives, with the memory and processing components of computer systems. Depending on the particular SCSI standard used, the SCSI bus may interconnect 7, 15, or 31 different mass storage devices with an internal bus within a computer system. Data transfer rates may range from 2 megabytes ("Mbytes") per second up to 40 Mbytes per second.

Significant limitations result in SCSI systems from the relatively small number of available bus connections, and from the fact that the bus connections are typically only accessible from a single computer system. These factors limit the amount of data available to a computer system, and the rate at which data can be transferred between a mass storage device and a computer system.

The fibre channel architecture and protocol for data communications has been developed in order to overcome the limitations imposed by the SCSI bus architecture. When optical fibers are employed as a physical medium for interconnecting computer systems and mass storage devices, a fibre channel network can extend for ten kilometers and can transfer data between a computer system and a mass storage device at up to 200 Mbytes per second. Fibre channel technology also provides network topologies and an addressing scheme which permit configurations that are much more powerful and flexible than those available using SCSI technology. Whereas the SCSI bus supports connection of up to 31 target devices, a fibre channel network can support connection of more than 16,000,000 target devices.

The fibre channel arbitrated loop (FC-AL) topology is the most commonly employed fibre channel topology. Using existing encoding and addressing schemes, a single FC-AL supports interconnection of up to 127 fibre channel devices. Fewer devices are used in practice, however, because propagation delay and general loop overhead increase as more and more devices are added to the loop. At some point, it is simply uneconomical to continue adding devices. Additional arbitrated loops may be used to support further devices, however this requires a fabric-based fibre channel topology, which is more complicated and expensive to implement than an individual arbitrated loop.

SUMMARY OF THE INVENTION

The present invention provides a system for selectively routing data within a fibre channel arbitrated loop. The system includes an intra-loop router configured to be coupled between a first segment and a second segment of the fibre channel arbitrated loop. The intra-loop router includes a router controller configured to be coupled with the first and second segments, and a processing system coupled with the router controller. The processing system is configured to receive fibre channel frames and cause those frames to be re-transmitted onto a selected one of the first and second segments of the fibre channel arbitrated loop.

BRIEF DESCRIPTION OF THE DRAWINGS

FIG. 5 is a schematic view of another segmented fibre channel arbitrated loop according to the present invention.

FIG. 6 is a schematic view of an intra-loop router according to the present invention, for selectively routing data within a fibre channel arbitrated loop.

FIG. 7 is a table depicting routing information that may be used by the intra-loop router shown in FIG. 6.

DETAILED DESCRIPTION OF THE INVENTION

Figure 1:
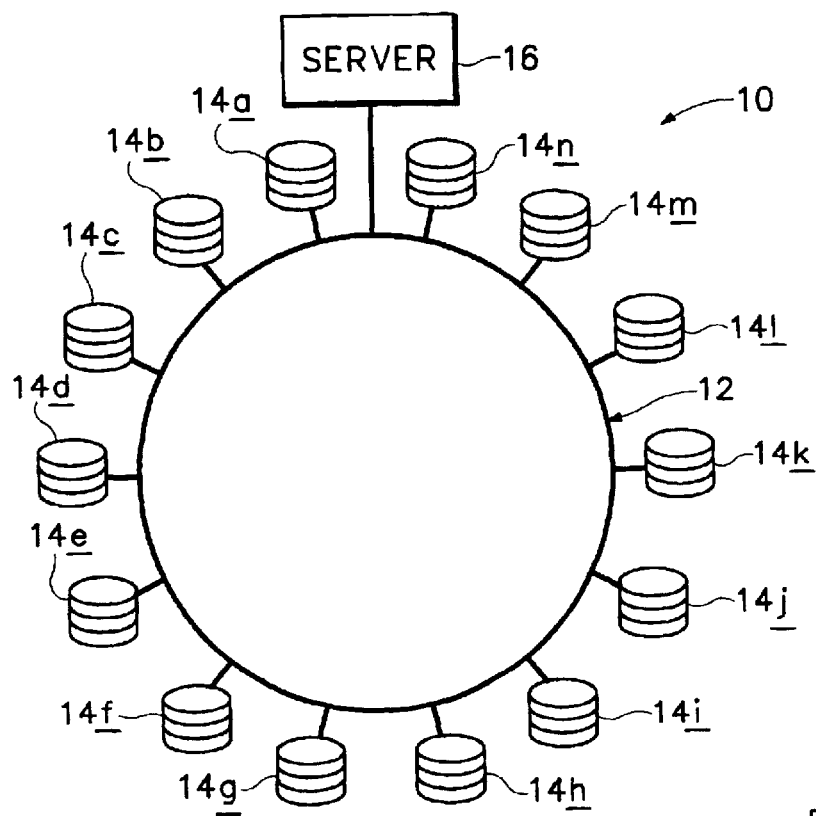
FIG. 1 is a schematic view of a fibre channel network, including various devices connected to an un-segmented fibre channel arbitrated loop.

FIG. 1 depicts a fibre channel network 10 including a representative fibre channel arbitrated loop (FC-AL) 12 interconnecting various devices. Under the existing fibre channel addressing scheme, each device connected to loop 12 may be assigned a unique 24-bit address. This address consists of three bytes—two "public" bytes and one "private" byte.

The two public bytes typically are used in fabric topologies that involve much more than a single arbitrated loop. In such a case, the public bytes are used to identify the arbitrated loop within the larger fibre channel environment. In other words, the public bytes (if used at all) would have the same value for any device connected to loop 12. Only the private byte differentiates the various devices connected to loop 12. The private byte is referred to as the arbitrated loop physical address, or AL-PA, and provides potential address space for 256 ($2^8$) different devices. However, due to existing encoding schemes, which require neutral disparity, only 127 of these addresses are used. Thus, 127 currently is the theoretical maximum number of devices that may be connected to a single FC-AL.

As shown in FIG. 1, the devices interconnected by arbitrated loop 12 may include storage devices such as disks 14 (individual disks are referenced 14a, 14b, etc., through 14n), computing devices such as server 16, and various other devices. Possible configurations, including different combinations of initiating and target devices, are numerous.

Figure 2:
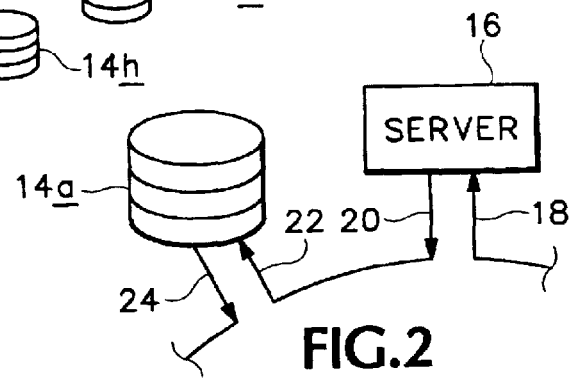
FIG. 2 is a partial view of the network shown in FIG. 1, depicting, in more detail, the interconnection of certain devices to the fibre channel arbitrated loop.

The configuration depicted in FIG. 1 is a true physical loop, in the sense that a continuous data path is provided from device to device around loop 12. Relative to each device connected to arbitrated loop 12, the loop includes a transmit lead and a receive lead for the particular device. For example, as shown in FIG. 2, receive lead 18 and transmit lead 20 correspond to server 16, and receive lead 22 and transmit lead 24 correspond to disk 14a. The transmit lead for each device on the loop is tied to the receive lead of its immediate downstream neighbor. Each device on the loop can thus communicate with all of the others, by passing fibre channel frames from device to device around loop 12. Devices typically are connected to their corresponding transmit and receive leads using a fibre channel interface controller (not shown).

Figure 3:
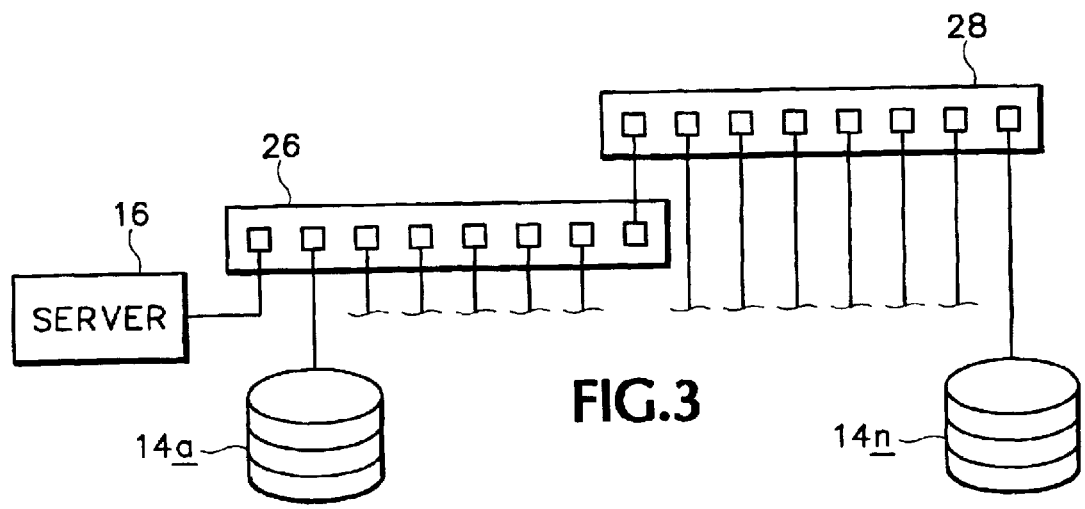
FIG. 3 is a schematic view of a fibre channel network, including various devices connected to an un-segmented fibre channel loop implemented in a cascaded-hub arrangement.

Often, it is desirable to bring the transmit and receive leads for all loop devices to a common central location. This may be achieved through use of fibre channel hubs 26 and 28, as depicted in FIG. 3. Each hub has a number of ports. Individual fibre channel devices may be connected to a particular port (e.g., disks 14), or an individual port may be used to cascade hubs together. Hubs 26 and 28 are shown in such a cascaded configuration. In any event, use of hubs 26 and 28 serves merely to concentrate connections, and does not alter the daisy-chain manner in which data is passed from device to device. The data path is the same as in FIG. 1—from server 16 to disk 14a, from disk 14a to disk 14b, and so on, all the way to disk 14n and back to server 16.

In addition to the above configurations, an FC-AL may be physically implemented within a multi-disk enclosure. In such a case, loop wiring is often provided within the enclosure as a backplane, enclosure-contained bus or similar arrangement.

In all of the above configurations, the performance of the loop decreases as more and more devices are brought on to the arbitrated loop. Data flowing around the loop is at least minimally handled by the interface controller of every connected device, such that each additional device introduces more propagation delay. Additional devices also increase contention for bandwidth and increase overhead associated with loop initialization, arbitration, and various other functions.

Figure 4:
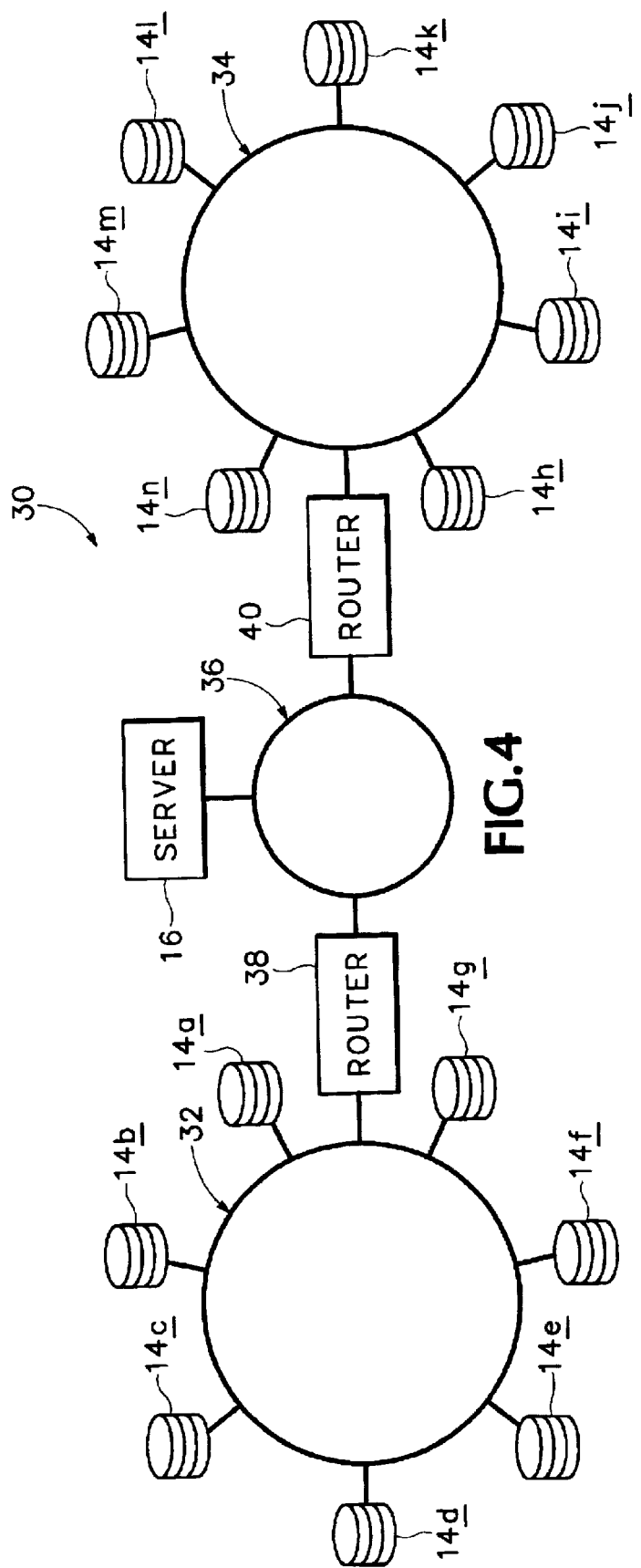
FIG. 4 is a schematic view of a fibre channel network, including various devices connected to a segmented fibre channel arbitrated loop according to the present invention.

FIG. 4 depicts a segmented fibre channel arbitrated loop 30 according to the present invention, which may be implemented to alleviate problems resulting from bringing additional devices onto an un-segmented arbitrated loop. Loop 30 is divided into three loop segments 32, 34 and 36, with the two outer segments (32 and 34) being connected to central segment 36 via intra-loop routers 38 and 40. As indicated, the various connected devices shown in FIG. 1 are also connected to segmented loop 30, however they have been divided into groups and variously connected to the different loop segments.

Although it is divided into segments, it will be appreciated that the depicted configuration still forms a single arbitrated loop. Similar to the un-segmented configuration shown in FIG. 1, all of the devices attached to the various loop segments are privately addressed. That is, the devices are identified using the lower byte of the three-byte fibre channel addressing scheme described above, i.e. the AL-PA (arbitrated loop physical address). Because all of the connected devices are addressed with AL-PAs, they occupy the same address space as an un-segmented arbitrated loop, and thus may be collectively considered a single FC-AL.

Segmented loop 30 may also be configured to operate as a single arbitrated loop, so that data flows in a daisy-chain manner serially through all of the connected devices, as in the configurations described with reference to FIGS. 1, 2 and 3. However, it will often be preferable that fibre channel frames be routed intelligently among selected loop segments, instead of always following the entire daisy-chain path described above. For example, intra-loop routers 38 and 40 may be configured to selectively forward fibre channel frames, so that the frames only flow on certain loop segments, as will be later explained in detail. Selective routing bypasses various devices in the system, eliminating the latency and performance deficit those devices would otherwise cause. Bypassing is made possible by providing loop segments, as illustrated by the configuration shown in FIG. 4, instead of a single, un-segmented loop.

A great number of segmented configurations are possible, in addition to the three-segment system shown in FIG. 4. The system shown in FIG. 4 may be modified to include only two loop segments, for example, outer segment 32 and central segment 36. More than three segments are also possible, as seen in FIG. 5, which depicts a segmented loop 44 having four outer loop segments 46. The outer loop segments are coupled to a central loop segment 48 via intra-loop routers 50 similar to those shown in FIG. 4. Further enhancement may be had by attaching additional segments to central segment 48 or outer segments 46, or by establishing redundant connections between the loop segments.

Referring now to FIG. 6, intra-loop router 40 (shown also in FIG. 4) will be described in more detail. Intra-loop router 40 has a processing system 60, which typically includes a processor 62 and a memory 64 configured to carry out various routing functions. Processing system 60 is coupled to a router controller 66. Router controller 66 is coupled to loop segment 36 via receive lead 68 and transmit lead 70, and to loop segment 34 via receive lead 72 and transmit lead 74. Router controller 76 may include fibre channel interface controllers such as FC hosts 78 and 80 to facilitate connection to interconnected loop segments 36 and 34. A buffer 82 may be provided to buffer traffic flowing between the interconnected loop segments, and between the various components of intra-loop router 40.

Routing information, such as that included in table 90 (FIG. 7), may be provided to facilitate selective routing of data by intra-loop router 40. Typically, the routing information is maintained by processing system 60 (e.g., within memory 64), and includes information concerning fibre channel devices logically or physically residing on loop segment 34, and/or devices logically or physically residing on segment 36.

Assume, for purposes of illustration, that table 90 includes information concerning the seven different storage devices connected to loop segment 34 (i.e., disks 14h, 14i, 14j, 14k, 14l, 14m and 14n). The routing information may include, in the third column of table 90, device identifiers 92 for each of the storage devices. These device identifiers may be thought of as "side segment" device identifiers, because they pertain to segment 34, which hangs off one side of central segment 36. They may also be considered "back-end" device identifiers, consistent with a naming convention where intra-loop router 40 is connected to central segment 36 at the "front end" of the router, with the connection to segment 34 being termed the "back end" of the router. Back-end device identifiers 92 uniquely identify the storage devices connected to loop segment 34, at least for purposes of that loop segment. Routing information may further include front-end identifiers 94, to be explained, that are associated with the front end of router 40 and central loop segment 36.

Figure 8:
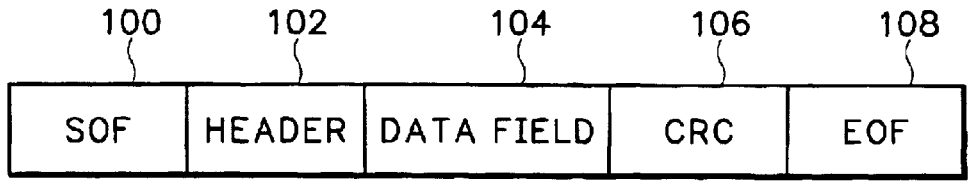
FIG. 8 depicts an exemplary fibre channel data frame.

Typically, back-end device identifiers 92 include the one-byte AL-PAs of the connected devices, as depicted in FIG. 7. These addresses have the same form, in part, as the addressing information embedded within fibre channel data frames. FIG. 8 depicts an exemplary fibre channel data frame, including SOF (start-of-frame) delimiter 100, header 102, data field 104, CRC (cyclic redundancy check) 106 and EOF (end-of-frame) delimiter 108. Data field 104 includes the data payload, which is the actual commands or other data packaged within the fibre channel frame. Header 102 includes fibre channel addressing information, including the source address and destination address within the fibre channel environment of the communicating devices (e.g., the three-byte fibre channel addresses of server 16 and disk 14m).

Referring now to FIGS. 4 and 6, an example will be described which illustrates how intra-loop router may be configured to effect routing based on the back-end identifiers described above. Assume a fibre channel frame traveling around central segment 36 in connection with a read transaction initiated by server 16 to disk 14m. The frame passes first from server 16 into intra-loop router 38. The processing system of intra-loop router 38 causes the frame to be retransmitted onto central loop segment 36 because the frame does not correlate with any of the back-end identifiers (e.g., identifiers 92) maintained by router 40 for the devices on segment 34. In other words, segment 32 is bypassed because the target device is not on that segment.

The frame then continues on counterclockwise around central segment 36 to intra-loop router 40. The read request is passed to router controller 66 via receive lead 68. Because the target address is on segment 34, processing system 60 causes the read request to be re-transmitted via transmit lead 74 onto loop segment 34. The requests travels counterclockwise around loop 34 to its destination at disk 14m. The read-out data from the disk passes counterclockwise around the remainder of segment 34 and is received by intra-loop router 40 via receive lead 72. Router 40 then passes the data on to central segment 36 via transmit lead 70, and the read-out data is passed along central loop segment 36 to server 16, completing the transaction.

In this example, loop segment 32 is entirely bypassed, and thus its connected devices are bypassed, because that loop segment contains neither of the communicating devices. Loop segment 34 would be similarly bypassed for transactions occurring between server 16 and one of the devices physically residing on loop segment 32. Bypassing connected devices enhances performance by eliminating the delay which would otherwise result from the data passing through those devices, for example as would occur in an un-segmented configuration.

Referring again to FIG. 7, back-end identifiers 92 are typically assigned during a "back-end" initialization process of loop segment 34. Typically, back-end initialization for each of loop segments 32 and 34 is conducted using a hard-addressing method, and is conducted separately from, and prior to, initialization of central segment 36. This raises the possibility of a device on segment 32 having a back-end identifier (e.g. an AL-PA) that is identical to the back-end identifier of a device on segment 34.

To alleviate this problem, and to provide logical/virtual access functionality which will be described, the routing information maintained by the intra-loop routers may include front-end identifiers 94, as seen in the second column of table 90. Initially, front-end identifiers 94 may have the same value as back-end identifiers 92. Intra-loop router 40 uses the initially-assigned front-end identifiers during front-end initialization of central loop segment 36. The front-end initialization of segment 36 differs somewhat from conventional fibre channel loop initialization. In particular, router 40 uses front-end identifiers 94 to present the back-end devices (i.e., the disks physically connected to segment 34) as virtual devices to the front-end (i.e., central segment 36). The virtual devices participate, along with any non-virtual devices connected to central loop 36, in the soft-addressing process associated with conventional FC-AL initialization. As is known in the art, this soft-addressing process resolves addressing conflicts between devices.

Accordingly, an initially-assigned front-end identifier will be changed in the event of a conflict. Non-conflicting identifiers will remain the same as the back-end identifiers. Table 90 provides examples of both situations. Devices 5 and 7 have different front and back-end identifiers, as a result of resolved conflicts on central loop segment 36. The other devices have back-end and front-end identifiers that are the same, indicating that no conflict occurred.

Once all conflicts are resolved and login has occurred, initiator devices on main segment 36, such as server 16, will see unique addresses for all of the devices on the various segments of the system. This may include virtual/logical addresses (e.g., front-end identifiers 94) for back-end devices (i.e., devices connected to side loop segments 32 and 34), as well as non-virtual addresses for devices connected directly to central segment 36 (i.e., without an intra-loop router). Logical access to back-end devices from central segment 36 is accomplished by mapping the front-end identifier to the back-end identifier for a given device.

Returning to the example above, where server 16 initiated a transaction with disk 14m, the server would "see" that disk on central segment 36 via the front-end logical identifier maintained for the disk by intra-loop router 40. Frames destined for disk 14m would bypass segment 32, due to intelligent routing effected by intra-loop router 38, and would eventually be received by intra-loop router 40. Intra-loop router 40 would then map the front-end identifier for disk 14m with the corresponding back-end identifier, and would route the frame onto loop segment 34 so that it would eventually reach the target disk.

Figure 9:
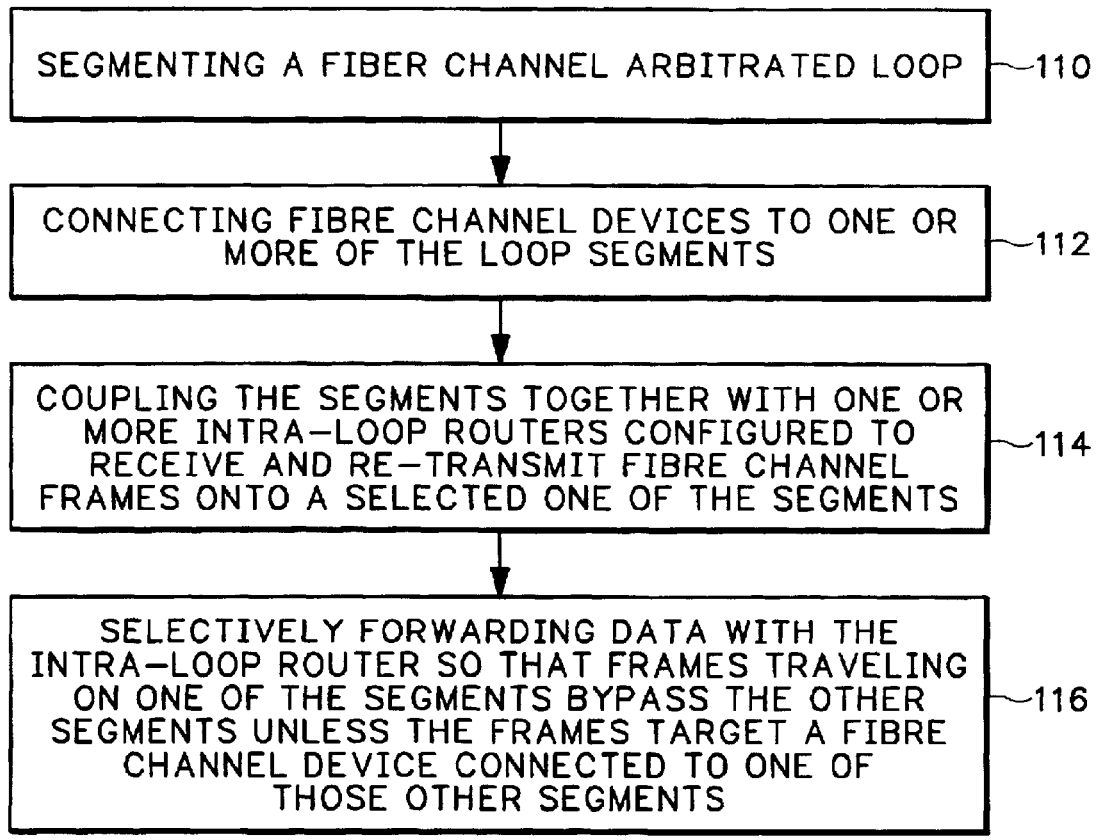
FIG. 9 is a flowchart depicting a method according to the present invention of improving the performance of a fibre channel arbitrated loop included within a fibre channel network.

It should be appreciated from the foregoing discussion that the invention also includes a method for improving the performance of an arbitrated loop-based storage network. FIG. 9 depicts an example of such a method. At 110, the method includes segmenting an FC-AL. As discussed above, this may include segmenting the loop into a central segment and two side segments, or into any other desired configuration having two or more loop segments. At 112, the method includes connecting fibre channel devices (typically, disk drives or other storage devices) to one or more of the loop segments. At 114, the method includes coupling the segments together with one or more intra-loop routers configured to receive and re-transmit fibre channel frames onto a selected one of the segments. As illustrated in FIG. 4, it may be desirable to separate target devices into two or more groups of roughly equal size, and locate each group on its own back-end segment, with all of the back-end segments being connected to a front-end segment via intra-loop routers. Finally, at 116, the method involves selectively forwarding data with the intra-loop router(s) so that fibre channel frames traveling on one of the segments bypass other segments unless the frames target a device connected to one of those other segments.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A system for selectively routing data within a fibre channel arbitrated loop, comprising:
    an intra-loop router configured to be coupled between a first segment and a second segment of the fibre channel arbitrated loop, the intra-loop router including:
        a router controller configured to be operatively coupled with a receive lead and a transmit lead of the first segment, and with a receive lead and a transmit lead of the second segment; and
        a processing system coupled with the router controller and configured to cause fibre channel frames received by the router controller to be re-transmitted by the router controller onto a selected one of the first and second segments, the processing system being further configured to maintain first segment device identifiers which identify devices connected to the first segment,
    where the intra-loop router is configured so that, if one of the first segment device identifiers causes a conflict on the second segment, the intra-loop router obtains a non-conflicting logical identifier corresponding to such first segment device identifier during initialization of the second segment, and where the processing system is configured to map the non-conflicting logical identifier to such first segment device identifier to avoid the conflict.

2. The system of claim 1, where the router controller includes two fibre channel interface controllers configured to be respectively coupled with the first and second segments.

3. The system of claim 1, where the intra-loop router is configured to cause a fibre channel frame received from the second segment to bypass the first segment, unless addressing information embedded within such fibre channel frame correlates with at least one the first segment device identifiers.

4. The system of claim 1, where the first segment device identifiers include arbitrated loop physical addresses of the devices connected to the first segment.

5. A segmented fibre channel arbitrated loop, comprising:
    a main segment;
    a side segment; and
    an intra-loop router coupled between the main segment and the side segment, the intra-loop router comprising:
        a router controller coupled between the main segment and the side segment; and
        a processing system coupled with the router controller and configured to cause fibre channel frames received by the router controller to be re-transmitted onto a selected one of the main segment and side segment, the processing system being further configured to maintain side segment device identifiers which identify devices connected to the side segment,
    where the intra-loop router is configured so that, if one of the side segment device identifiers causes a conflict on the main segment, the intra-loop router obtains a non-conflicting logical identifier corresponding to such side segment device identifier during initialization of the main segment, and where the processing system is configured to map the non-conflicting logical identifier to such side segment device identifier to avoid the conflict.

6. The segmented fibre channel arbitrated loop of claim 5, where the processing system maintains identifying information about devices connected to the side segment, and where the processing system causes fibre channel frames received from the main segment to bypass the side segment unless those frames target at least one of the devices on the side segment.

7. The segmented fibre channel arbitrated loop of claim 5, where the router controller includes two fibre channel interface controllers respectively coupled with the main segment and side segment.

8. The segmented fibre channel arbitrated loop of claim 5, where the intra-loop router is configured to cause a fibre channel frame received from the main segment to bypass the side segment, unless addressing information embedded within such fibre channel frame correlates with at least one the side segment device identifiers.

9. The segmented fibre channel arbitrated loop of claim 5, where the side segment device identifiers include arbitrated loop physical addresses of the devices connected to the side segment.

10. The segmented fibre channel arbitrated loop of claim 5, further comprising a second side segment coupled with the main segment via a second intra-loop router.

* * * * *

UNITED STATES PATENT AND TRADEMARK OFFICE
CERTIFICATE OF CORRECTION

PATENT NO. : 6,947,393 B2 Page 1 of 1
APPLICATION NO. : 09/823382
DATED : September 20, 2005
INVENTOR(S) : William Gordon Hooper, III It is certified that error appears in the above-identified patent and that said Letters Patent is hereby corrected as shown below:

In column 1, line 16, delete "modem" and insert -- modern --, therefor.

In column 4, line 54, before "14k" delete "14$i$," and insert -- 14j, --, therefor.

Signed and Sealed this

Fifteenth Day of June, 2010

David J. Kappos
*Director of the United States Patent and Trademark Office*